(12) United States Patent
Yan

(10) Patent No.: US 7,562,522 B2
(45) Date of Patent: Jul. 21, 2009

(54) ENHANCED HYBRID DE-NOX SYSTEM

(75) Inventor: Jiyang Yan, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/447,810

(22) Filed: Jun. 6, 2006

(65) Prior Publication Data

US 2007/0277507 A1 Dec. 6, 2007

(51) Int. Cl.
*F01N 3/00* (2006.01)

(52) U.S. Cl. .............................. 60/286; 60/274; 60/295; 60/301; 48/197 R

(58) Field of Classification Search ................... 60/274, 60/286, 295, 297, 299, 301, 303; 48/197 R
See application file for complete search history.

(56) References Cited

U.S. PATENT DOCUMENTS

| | | | |
|---|---|---|---|
| 5,727,385 | A | 3/1998 | Hepburn |
| 6,176,079 | B1 * | 1/2001 | Konrad et al. ................. 60/274 |
| 6,202,407 | B1 | 3/2001 | Brusasco et al. |
| 6,374,595 | B1 * | 4/2002 | Penetrante et al. ............ 60/275 |
| 6,677,264 | B1 | 1/2004 | Klein et al. |
| 6,725,647 | B2 | 4/2004 | Pfeifer et al. |
| 6,732,507 | B1 | 5/2004 | Stanglmaier et al. |
| 6,832,473 | B2 | 12/2004 | Kupe et al. |
| 6,846,464 | B2 | 1/2005 | Montreuil et al. |
| 6,973,776 | B2 | 12/2005 | van Nieuwstadt et al. |
| 6,996,975 | B2 * | 2/2006 | Radhamohan et al. ........ 60/286 |
| 7,063,642 | B1 * | 6/2006 | Hu et al. ..................... 477/100 |
| 7,210,288 | B2 * | 5/2007 | Bandl-Konrad et al. ....... 60/297 |
| 7,240,484 | B2 * | 7/2007 | Li et al. ........................ 60/286 |
| 7,257,941 | B1 | 8/2007 | Reuter |
| 2004/0050037 | A1 | 3/2004 | Betta et al. |
| 2004/0076565 | A1 | 4/2004 | Gandhi et al. |
| 2006/0010859 | A1 | 1/2006 | Yan et al. |
| 2007/0012032 | A1 | 1/2007 | Hu et al. |

FOREIGN PATENT DOCUMENTS

| | | |
|---|---|---|
| WO | WO 2004/006128 A1 | 7/2004 |
| WO | WO 2004/090296 | 10/2004 |

* cited by examiner

*Primary Examiner*—Binh Q Tran
(74) *Attorney, Agent, or Firm*—Paul V. Keller

(57) ABSTRACT

An exhaust aftertreatment system including a lean NOx trap, an ammonia-SCR catalyst, and an additional catalyst configured in between. The lean NOx trap adsorbs NOx from lean exhaust and produces ammonia during regeneration. The SCR catalyst adsorbs most of that ammonia and subsequently uses that ammonia to reduce NOx. The additional catalyst is adapted to reduce the concentration of hydrocarbons in the exhaust during LNT regeneration and thereby mitigate hydrocarbon poisoning of the SCR. In one embodiment, the additional catalyst is a hydrocarbon-SCR catalyst. In another embodiment, the additional catalyst is an oxidation Catalyst. In a further embodiment, the additional catalyst is a hydrocarbon adsorbent. An oxidation catalyst can be made to store oxygen for hydrocarbon oxidation while avoiding excessive oxidation of ammonia by appropriately limiting that oxygen storage capacity.

9 Claims, 2 Drawing Sheets

ENHANCED HYBRID DE-NOX SYSTEM

FIELD OF THE INVENTION

The present invention relates to pollution control systems and methods for diesel and lean burn gasoline engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons. This disclosure uses the terms ammonia-SCR and HC-SCR to clarify the distinction.

LNTs are devices that adsorb NOx under lean exhaust conditions and reduce and release the adsorbed NOx under rich condition. A LNT generally includes a NOx adsorbent and a catalyst. The adsorbent is typically an alkaline earth compound, such as $BaCO_3$ and the catalyst is typically a precious metal, such as Pt or Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to regenerate (denitrate) the LNT.

A LNT can produce ammonia during denitration. Accordingly, it has been proposed to combine a LNT and an ammonia-SCR catalyst into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate. WO 2004/090296 describes such a system wherein there is an inline reformer upstream of the LNT and the SCR catalyst.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. The transmission gear ratio can be changed to shift the engine to an operating point that produces equal power but contains less oxygen. However, at least in the case of a diesel engine, it is generally necessary to eliminate some of the oxygen in the exhaust by combustion or reforming reactions with reductant that is injected into the exhaust.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream of the engine.

The reactions between reductant and oxygen can take place in the LNT, although it is generally preferred for the reactions to occur in a catalyst upstream of the LNT, whereby the heat of reaction does not cause large temperature increases within the LNT at every regeneration.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat is provided through the same types of reactions as used to remove excess oxygen from the exhaust. The temperature of the LNT is generally controlled during desulfation, as the temperatures required for desulfation are generally close to those at which the LNT catalyst undergoes thermal deactivation.

U.S. Pat. No. 6,832,473 describes a system wherein the reductant is reformate produced outside the exhaust stream and injected into the exhaust as needed. During desulfations, the reformate is injected upstream of an oxidation catalyst. Heat generated by combustion of the reformate over the oxidation catalyst is carried by the exhaust to the LNT and raises the LNT to desulfations temperatures.

U.S. Pat. Pub. No. 2003/0101713 describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate. For desulfations, heat produced by the reformer is used to raise the LNT to desulfations temperatures.

U.S. Pat. No. 5,727,385 describes a system in which a hydrocarbon-SCR (HC-SCR) catalyst is configured upstream of an LNT. The two components together are said to provide higher NOx conversion than either of the components individually.

U.S. Pat. No. 6,677,264 describes a combined LNT/HC-SCR catalyst. The catalyst comprises two layers on a support. The first layer is a NOx absorber-catalyst and the second layer is an HC-SCR catalyst having a HC-storing function provided by a zeolite. The HC-storage function is intended to concentrate hydrocarbon reductants in the vicinity of the catalyst and thereby increase activity.

U.S. Pat. No. 6,202,407 describes an HC-SCR catalyst that has a hydrocarbon-storing function. In one embodiment, a diesel fuel reductant supply is pulsed and the catalyst continues to show activity for extended periods between the pulses.

U.S. Pat. No. 6,725,647 describes a system having an ammonia synthesis catalyst and a SCR catalyst with an oxidation catalyst in between for increasing the proportion between $NO_2$ and NO under lean conditions, thereby increasing the conversion efficiency of the SCR catalyst. Ammonia oxidation is said to be negligible due to the low concentration of oxygen under the rich conditions during which the ammonia is generated.

U.S. Pat. No. 6,846,464 also seeks to provide an optimal NO to $NO_2$ ratio. The background notes that SCR catalysts are susceptible to hydrocarbon poisoning. The proposed solution involves two exhaust branches that unite into a SCR catalyst. In one branch, only hydrocarbons are oxidized, leaving NO substantially unchanged. In the other, both hydrocarbons and NO are oxidized.

U.S. Pat. No. 6,973,766 places a lean NOx catalyst upstream of an oxidation catalyst and an SCR catalyst in order to prevent hydrocarbons from poisoning the ammonia-SCR catalyst during warm-up of the oxidation catalyst.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

One of the inventor's concepts relates to an exhaust aftertreatment system, suitable for a vehicle with a diesel engine. The exhaust aftertreatment system includes a lean NOx trap, an ammonia-SCR catalyst, and an additional catalyst configured in between. The lean NOx trap adsorbs NOx from lean exhaust and produces ammonia during regeneration. The SCR catalyst adsorbs most of that ammonia and subsequently uses that ammonia to reduce NOx. The additional catalyst is adapted to reduce the concentration of hydrocarbons in the exhaust during LNT regeneration and thereby mitigate hydrocarbon poisoning of the SCR. In one embodiment, the additional catalyst comprises a hydrocarbon-SCR catalyst. In another embodiment, the additional catalyst comprises an oxidation catalyst. An oxidation catalyst can be made to store oxygen for hydrocarbon oxidation while avoiding excessive oxidation of ammonia by appropriately limiting that oxygen storage capacity. In a further embodiment, the additional catalyst comprises a hydrocarbon adsorbent.

Another of the inventor's concepts relates to a method of treating diesel engine exhaust. The exhaust is passed through a LNT that adsorbs and stores NOx when the exhaust is lean and reduces the stored NOx and releases nitrogen and ammonia when the exhaust is rich. After passing the exhaust through the LNT, the exhaust is passed though an additional catalyst that reduces NOx by reaction with hydrocarbons. After passing the exhaust through the additional catalyst, the exhaust is passed through an ammonia-SCR catalyst that adsorbs ammonia from the exhaust when the exhaust is rich and reduces NOx in the exhaust by reaction with ammonia when the exhaust is lean.

A further concept also relates to a method of treating diesel engine exhaust. The exhaust is passed through a LNT that adsorbs and stores NOx when the exhaust is lean and reduces the stored NOx and releases nitrogen and ammonia when the exhaust is rich. From time to time, the exhaust is made rich in order to regenerate the LNT. After passing the exhaust through the LNT, the exhaust is passed through an oxidation catalyst that reduces the hydrocarbon concentration in the exhaust during regeneration of the LNT. After passing the exhaust through the oxidation catalyst, the exhaust is passed through an ammonia-SCR catalyst that adsorbs ammonia from the exhaust when the exhaust is rich and reduces NOx in the exhaust by reaction with ammonia when the exhaust is lean.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claim as their invention being reserved for the claims that follow.

DETAILED DESCRIPTION

Figure 1:
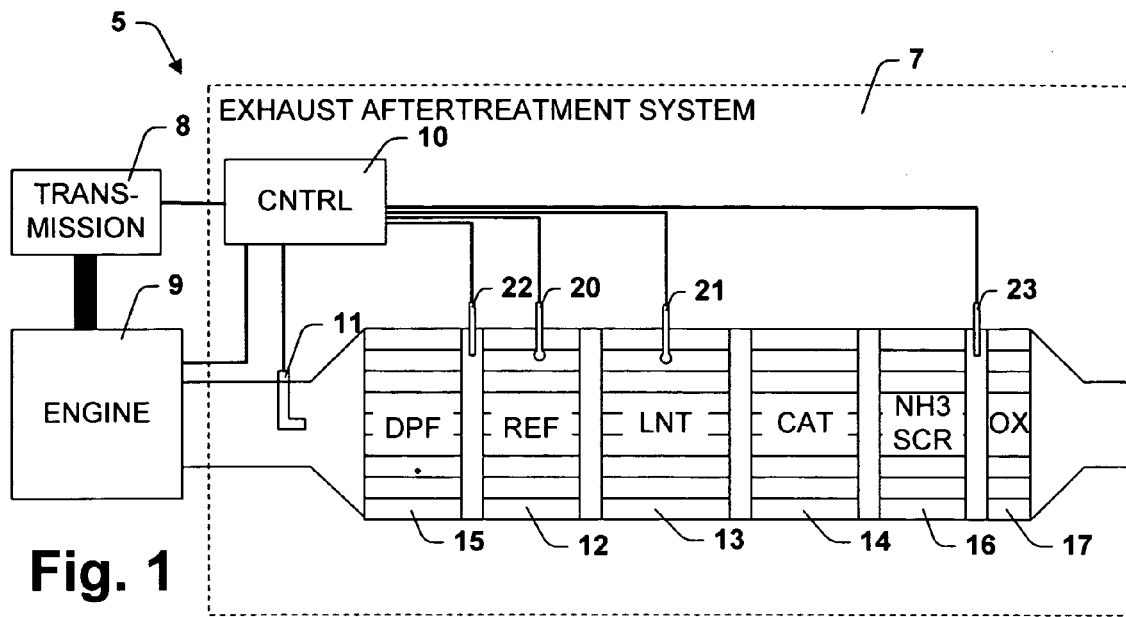
FIG. 1 is schematic illustration of a power generation system conceived by the inventor.

FIG. 1 provides a schematic illustration of an exemplary power generation system 5 in which various concepts of the inventor can be implemented. The system 5 comprises an engine 9, a transmission 8, and an exhaust aftertreatment system 7. The exhaust aftertreatment system 7 includes a controller 10, a fuel injector 11, a reformer 12, a lean NOx-trap (LNT) 13, an additional catalyst 14, an ammonia-SCR catalyst 16, a diesel particulate filter (DPF) 15, and a clean-up catalyst 17. The controller 10 receives data from several sources; including temperature sensors 20 and 21 and NOx sensors 22 and 23. The controller 10 may be an engine control unit (ECU) that also controls the transmission 8 and the exhaust aftertreatment system 7 or may include several control units that collectively perform these functions.

The exhaust from the engine 9 generally contains products of lean combustion including NOx, particulates, and some oxygen (typically 5-15%). The DPF 15 removes most of the particulates. During lean operation (a lean phase), the LNT 13 adsorbs a portion of the NOx. The ammonia-SCR catalyst 16 may have ammonia stored from a previous regeneration of the LNT 13 (a rich phase). If the ammonia-SCR catalyst 16 contains stored ammonia, it removes an additional portion of the NOx from the lean exhaust. The clean-up catalyst 17 may serve to oxidize CO and unburned hydrocarbons.

The additional catalyst 14 functions to mitigate poisoning of the ammonia-SCR catalyst 16 by hydrocarbons during the rich phases, which are used to regenerate the LNT 13. In one embodiment, the additional catalyst 14 performs that function by catalyzing a reaction between hydrocarbons and NOx slipping from the LNT 13. In another embodiment, the additional catalyst 14 performs that function by oxidizing the hydrocarbons. In a further embodiment, the additional catalyst 14 performs that function by adsorbing hydrocarbons. In either case, a substantial portion of the hydrocarbons slipping the LNT 13 are removed from the exhaust prior to the exhaust reaching the ammonia-SCR catalyst 16. Optionally, the additional catalyst 14 is multifunctional or comprises multiple catalysts, whereby the additional catalyst 14 can mitigate hydrocarbon poisoning of the ammonia-SCR catalyst 16 through a plurality of mechanisms.

Figure 2:
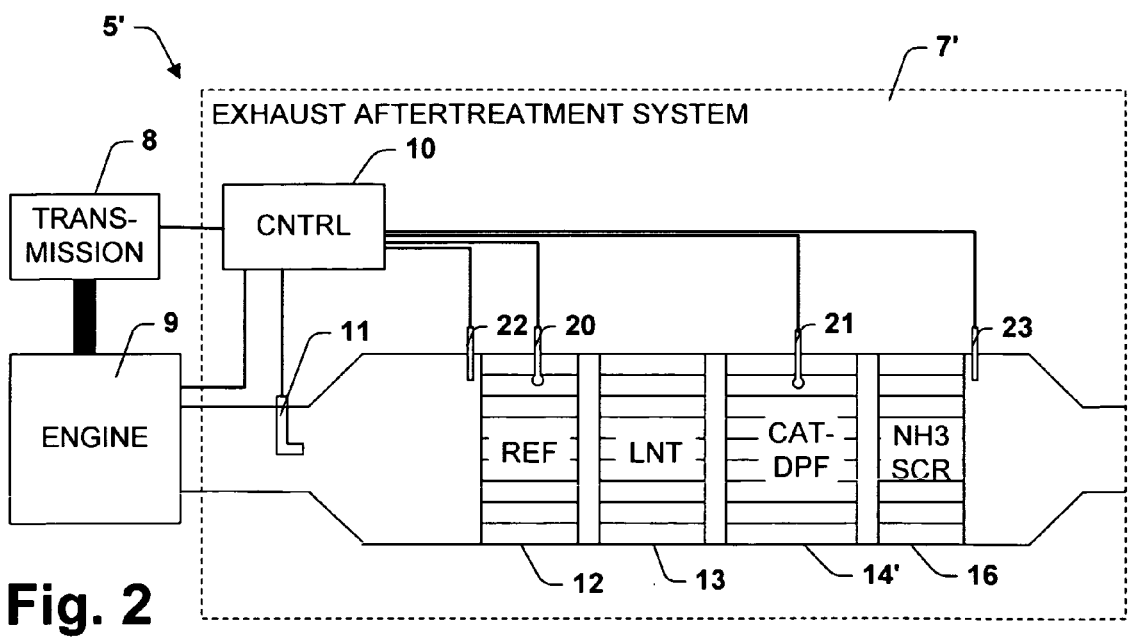
FIG. 2 is schematic illustration of another power generation system conceived by the inventor.

FIG. 2 provides an exemplary power generation system 5' having an exhaust treatment system 7' with an additional catalyst 14' that also functions as a DPF between the LNT 13 and the ammonia-SCR catalyst 16. The additional catalyst can be integrated, for example, as a coating on either or both the entry-side or the exit-side passages of the DPF.

Where the additional catalyst 14 is a hydrocarbon-SCR catalyst, it can be adapted to mitigate hydrocarbons and/or NOx during the lean phases as well. One concept is that a hydrocarbon-SCR catalyst can adsorb and store hydrocarbons. This function may be particularly useful while the exhaust system 7 is warming up. Another concept is that a hydrocarbon-SCR catalyst used as the additional catalyst 14 can significantly reduce NOx during the lean phases by hydrocarbon-SCR using either stored hydrocarbons or residual hydrocarbons contained in the exhaust. The additional catalyst 14 can also help control NOx during the rich phases.

Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides include alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Figure 3:
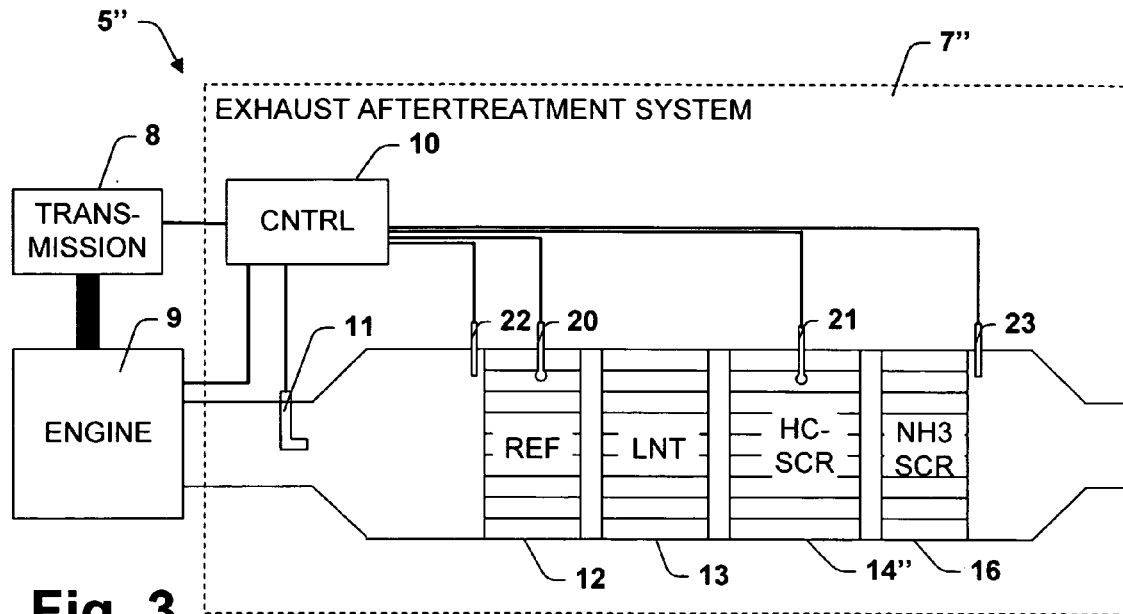
FIG. 3 is schematic illustration of a further power generation system conceived by the inventor.

FIG. 3 provides an exemplary power generation system 5" having an exhaust treatment system 7" that uses a hydrocarbon-SCR catalyst 14" as the additional catalyst 14. In the system 7", the exhaust is passed through the LNT 13, which adsorbs and stores NOx when the exhaust is lean and reduces the stored NOx and releases nitrogen and ammonia when the exhaust is rich. After passing the exhaust through the LNT 13, the exhaust is passed the through the hydrocarbon-SCR catalyst 14". When the exhaust is rich, the hydrocarbon-SCR catalyst 14" reduces the hydrocarbon concentration in the exhaust, either by reacting the hydrocarbons with NOx or by storing the hydrocarbons for later reaction with NOx. After passing the exhaust through the hydrocarbon-SCR catalyst 14", the exhaust is passed through the ammonia-SCR catalyst 16, which adsorbs ammonia from the exhaust when the exhaust is rich and reduces NOx in the exhaust by reaction with ammonia when the exhaust is lean.

Figure 4:
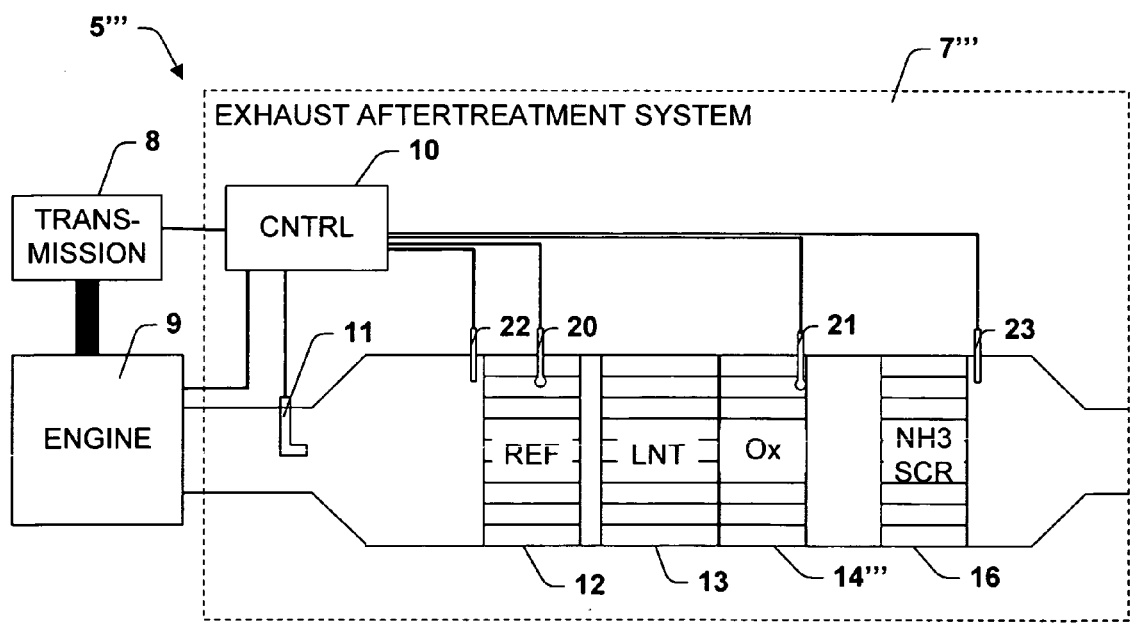
FIG. 4 is schematic illustration of a still further power generation system conceived by the inventor.

During each rich phase, particularly at the beginning of each rich phase, the LNT 13 may release a significant amount of NOx that is not reduced in the LNT 13. This can produce the highest concentrations of NOx seen by the hydrocarbon-SCR catalyst 14" over both rich and lean phases. When this NOx spike occurs, hydrocarbons stored in the hydrocarbon-SCR catalyst 14" may be oxidized by reactions with NOx. This oxidation may function to substantially reduce the level of stored hydrocarbon and/or to substantial reduce the NOx spike. Hydrocarbons stored in the hydrocarbon-SCR catalyst 14" may have been stored previously during either lean or rich phases. The hydrocarbon-SCR catalyst 14" is not required to have a hydrocarbon storage capacity, although such a capacity is preferred.

Where the additional catalyst 14 is a oxidation catalyst, it may oxidize hydrocarbons during the rich phase using either residual oxygen in the exhaust or using oxygen stored in the oxidation catalyst during a previous lean phase. FIG. 4 provides an exemplary power generation system 5''' having an exhaust treatment system 7''' that uses an oxidation catalyst 14''' as the additional catalyst 14. Generally the oxidation catalyst 14''' will have some oxygen storage capacity, however, in order to prevent excessive oxidation of ammonia, that oxygen storage capacity is preferably limited.

Another of the inventor's concepts is that hydrocarbon slip from the LNT 13 occurs primarily towards the beginnings of the rich regeneration phases, whereas ammonia production takes place primarily towards the ends of the rich regeneration phases. By appropriately tailoring the oxygen storage capacity of the oxidation catalyst 14''', the stored oxygen is substantially consumed by hydrocarbon oxidation, leaving comparatively little oxygen to oxidize ammonia.

The appropriate oxygen storage capacity is highly system dependent. More oxygen storage capacity is required as hydrocarbon slip form the LNT 13 increases, and less oxygen storage capacity is required as the residual concentration of oxygen increases. One factor affecting the amount of slipping hydrocarbon is the method by which the exhaust is made rich. The exhaust may be made rich by injecting hydrocarbons into engine cylinders or injecting hydrocarbons somewhere along the exhaust. The exhaust may be processed through an oxidation catalyst or a reforming catalyst prior to entering the LNT 13. The fuel may also be processed through a reformer prior to injection into the exhaust. Engine intake air throttling and/or increased EGR may or may not be used to help make the exhaust rich. The size, catalyst loading, and catalyst composition of the reformer 12 and the LNT 13 will each affect the required oxygen storage capacity. In a given system, the slip rate is also affected by the conditions of LNT regeneration, including exhaust flow rate, oxygen content, catalyst temperature, and the reductant injection rate.

In view of these variables, one approach is to determine the ideal oxygen storage capacity experimentally, for example by integrating the hydrocarbon slip from an experimental oxidation catalyst 14''' having no or a known oxygen storage capacity over a series of LNT regenerations. A typically slip rate is on the order of 1-2%. Typical oxygen concentrations are less than hydrocarbon concentrations in rich exhaust (the rich phase), but can be comparable. The degree of slip may cover a significant range, with values within the range depending on the particular conditions of regeneration. In one embodiment, an oxygen storage capacity is selected that gives a near optimal balance between improving NOx conversion in the SCR 16 by mitigating hydrocarbon poisoning and improving NOx conversion by reducing oxidation of ammonia.

A further concept is to set the oxygen storage capacity towards the high end of a range of optimal values (a range that depends on the conditions of regeneration, which may vary according to vehicle operation). During those regenerations for which the oxygen storage capacity is higher than required, the degree of hydrocarbon slip toward the beginning of regeneration can be intentionally increased in order that stored oxygen is substantially consumed before ammonia generation peaks. Hydrocarbon slip can be increased by increasing a reductant injection rate.

Additional measures may be taken to achieve hydrocarbon oxidation without excessively oxidizing ammonia. One such measure is to close-couple the oxidation catalyst 14''' and the LNT 13, as illustrated in FIG. 4. Close-coupling eliminates dead space between the LNT 13 and the oxidation catalyst 14'''. This dead space can cause mixing between lean exhaust and rich exhaust as the exhaust is switched from lean to rich. The dead space can also cause hydrocarbons slipping early in the regeneration to mix with ammonia slipping later in the regeneration.

Another measure is to reduce the fuel injection rate over the course of regeneration from a peak. During the early part of the regeneration, more reductant is generally required. Towards the end of the regeneration, the reductant injection rate can be reduced and the reductant concentration can be allowed to decrease, whereby hydrocarbon slip can be substantially reduced for the period when the oxidation catalyst 14''' is depleted of oxygen.

A typical oxidation catalyst comprises a supported precious metal, such as platinum. Oxygen storage capacity is typically provided by $CeO_2$, but other materials such as NiO and FeO can be used. Hydrocarbon storage capacity can be provided using zeolites.

In the system 7''', the exhaust is passed through the LNT 13, which adsorbs and stores NOx when the exhaust is lean and reduces the stored NOx and releases nitrogen and ammonia when the exhaust is rich. From time to time, the exhaust is made rich in order to regenerate the LNT 13. After passing the exhaust through the LNT, the exhaust is passed though the oxidation catalyst 14''', which reduces the hydrocarbon concentration when the exhaust is rich. After passing the exhaust through the oxidation catalyst 14''', the exhaust is passed through the ammonia-SCR catalyst 16, which adsorbs ammonia from the exhaust when the exhaust is rich and reduces NOx in the exhaust by reaction with stored ammonia when the exhaust is lean.

The oxidation catalyst 14''' can also perform useful functions during the lean phases. One potentially useful function is oxidation of hydrocarbons in lean exhaust, thus reducing hydrocarbon emissions even in the absence of a clean-up catalyst 17. Hydrocarbon emissions during lean phases can also be reduced by adsorbing hydrocarbons on the oxidation catalyst 14''', provided the catalyst has a suitable hydrocarbon adsorption capacity.

Another potential function is oxidizing NO to $NO_2$, thereby increasing the efficiency of ammonia-SCR over the catalyst 16. An ideal ratio for ammonia-SCR is generally about 1:1 NO to $NO_2$. This ratio is generally much higher at the outlet of the LNT 13.

A further potential function of the oxidation catalyst 14''' is oxidizing $H_2S$ to $SO_2$ during desulfation of the LNT 13. Desulfation generally requires rich conditions. Over the course of a desulfation, conditions can be made lean periodically if necessary to renew the stored oxygen in the oxidation catalyst 14'''

From time-to-time, the LNT 13 must be regenerated to remove accumulated NOx (denitrated). Denitration may involve first heating the reformer 12 to an operational temperature by injecting fuel at a sub-stoichiometric rate with respect to the oxygen in the exhaust whereby the injected fuel reacts in the reformer 12 in an excess of oxygen. An operational temperature for the reformer 12 depends on the reformer design. Once the reformer 12 is sufficiently heated, denitration may proceed by injecting fuel at a super-stoichiometric rate whereby the reformer 12 consumes most of the oxygen in the exhaust while producing reformate. Reformate thus produced reduces NOx adsorbed in the LNT 13. Some of this NOx is reduced to $NH_3$, most of which is captured by the ammonia-SCR catalyst 14 and used to reduce NOx during a subsequent lean phase. The clean-up catalyst 17 oxidizes unused reductants and unadsorbed $NH_3$ using stored oxygen or residual oxygen remaining in the exhaust during the rich phases.

From time-to-time, the LNT 13 must also be regenerated to remove accumulated sulfur compounds (desulfated). Desulfation may involve heating the reformer 12 to an operational temperature, heating the LNT 13 to a desulfating temperature, and providing the heated LNT 13 with a reducing atmosphere. Desulfating temperatures vary, but are typically in the range from about 500 to about 800° C., more typically in the range from about 650 to about 750° C. Below a minimum temperature, desulfation is very slow. Above a maximum temperature, the LNT 13 may be damaged.

While the engine 9 is preferably a compression ignition diesel engine, the various concepts of the invention are applicable to power generation systems with lean-burn gasoline engines or any other type of engine that produces an oxygen rich, NOx-containing exhaust. For purposes of the present disclosure, NOx consists of NO and $NO_2$.

The transmission 8 can be any suitable type of automatic transmission. The transmission 8 can be a conventional transmission such as a counter-shaft type mechanical transmission, but is preferably a CVT. A CVT can provide a much larger selection of operating points than a conventional transmission and generally also provides a broader range of torque multipliers. In general, a CVT will also avoid or minimize interruptions in power transmission during shifting. Examples of CVT systems include hydrostatic transmissions; rolling contact traction drives; overrunning clutch designs; electrics; multispeed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel injector 11 can be of any suitable type. Preferably, it provides the fuel in an atomized or vaporized spray. The fuel may be injected at the pressure provided by a fuel pump for the engine 9. Preferably, however, the fuel passes through a pressure intensifier operating on hydraulic principles to at least double the fuel pressure from that provided by the fuel pump to provide the fuel at a pressure of at least about 4 bar.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 600 to about 1100° C. A preferred reformer has a low thermal mass and a low catalyst loading as compared to a device designed to produce reformate at exhaust gas temperatures.

The LNT 13 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The adsorbant is typically combined with a binder and either formed into a self-supporting structure or applied as a coating over an inert substrate.

The LNT 13 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalyst 16 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 16 is designed to tolerate temperatures required to desulfate the LNT 13.

The particulate filter 15 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less.

The location of the DPF 15 is optional. Between the reformer 12 and the LNT 13, the DPF 15 can serve to protect the LNT 13 from temperature excursions associated with the operation of the reformer 12. Between the LNT 13 and the ammonia-SCR catalyst 16, the DPF 15 can help protect the SCR catalyst 16 from desulfation temperatures. Optionally, one or more of the reformer 12, the LNT 13, the additional catalyst 14, and the ammonia-SCR catalyst 16 is integrated as a coating or within the structure of the DPF 15.

The DPF 15 is regenerated to remove accumulated soot. The DPF 15 can be of the type that is regenerated continuously or intermittently. For intermittent regeneration, the DPF 15 is heated, using a reformer 12 for example. The DPF 15 is heated to a temperature at which accumulated soot combusts with $O_2$. This temperature can be lowered by providing the DPF 15 with a suitable catalyst. After the DPF 15 is heated, soot is combusted in an oxygen rich environment.

For continuous regeneration, the DPF 15 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, Nd, Pt, and Pd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 15 is suitably placed upstream of the reformer 12. Where the DPF 15 is not continuously regenerated, it is generally positioned downstream of the reformer 12.

The clean-up catalyst 17 is preferably functional to oxidize unburned hydrocarbons from the engine 9, unused reductants, and any $H_2S$ released from the NOx absorber-catalyst 13 and not oxidized by the ammonia-SCR catalyst 16 or the additional catalyst 14. Any suitable oxidation catalyst can be used. To allow the clean-up catalyst 17 to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A diesel engine exhaust aftertreatment system, comprising:
   a lean NOx trap comprising an effective amount of $NO_x$ adsorbent selected from the group consisting of alkali and alkaline earth metal compounds to adsorb and store NOx from lean exhaust and adapted to reduce and release the stored NOx under rich exhaust conditions;
   an ammonia-SCR catalyst configured to receive gases released from the lean NOx trap and functional to catalyze a reaction with ammonia that can reduce NOx in a lean environment; and
   an additional catalyst, configured between the lean NOx trap and the ammonia-SCR catalyst, the additional catalyst comprising:
      a) an effective amount of one or more supported transition metals functional to catalyze reactions between $NO_x$ and hydrocarbons under rich conditions whereby the additional catalyst is functional mitigate poisoning of the ammonia-SCR catalyst by hydrocarbons during LNT regeneration by catalyzing reactions between $NO_x$ and hydrocarbons under rich conditions;
      b) an effective amount of oxidation catalyst and an effective amount of oxygen-storing material, whereby the additional catalyst is functional to mitigate poisoning of the ammonia-SCR catalyst during LNT regeneration by oxidizing hydrocarbons under rich conditions using oxygen stored by the additional catalyst; or
      c) an effective amount of a hydrocarbon adsorbant, whereby the additional catalyst is functional to mitigate poisoning of the ammonia-SCR catalyst by hydrocarbons during LNT regeneration by adsorbing hydrocarbons under rich conditions;
   wherein the lean NOx trap is functional to generate ammonia under rich exhaust conditions and the ammonia-SCR catalyst is functional to adsorb most of the ammonia so generated;
   the ammonia-SCR catalyst is functional to reduce NOx passing the lean NOx trap by catalyzing a reaction of NOx with the adsorbed ammonia; and
   the additional catalyst is functional to mitigate poisoning of the ammonia-SCR catalyst by hydrocarbons.

2. The system of claim 1, further comprising
   a conduit configured to channel exhaust to the lean NOx trap; and
   a fuel reformer positioned within the conduit, whereby at least the bulk of the exhaust passing through the conduit also passes through the fuel reformer.

3. The system of claim 1, wherein the additional catalyst comprises an effective amount of one or more supported transition metals functional to catalyze reactions between $NO_x$ and hydrocarbons under rich conditions whereby the additional catalyst is functional mitigate poisoning of the ammonia-SCR catalyst by hydrocarbons during LNT regeneration by catalyzing reactions between $NO_x$ and hydrocarbons under rich conditions.

4. The system of claim 1, wherein the additional catalyst comprises an effective amount of oxidation catalyst and an effective amount of oxygen-storing material, whereby the additional catalyst is functional to mitigate poisoning of the ammonia-SCR catalyst during LNT regeneration by oxidizing hydrocarbons under rich conditions using oxygen stored by the additional catalyst.

5. The system of claim 1, wherein the additional catalyst comprises a an effective amount of a hydrocarbon adsorbant selected from the group consisting of amphoteric metal oxides, zeotlies, and combinations thereof that are functional to adsorb hydrocarbons under rich conditions, whereby the additional catalyst is functional to mitigate poisoning of the ammonia-SCR catalyst by hydrocarbons during LNT regeneration by adsorbing hydrocarbons under rich conditions.

6. The system of claim 4, wherein the oxygen storage capacity of the oxidation catalyst is limited, whereby the oxidation catalyst is functional to store enough oxygen to oxidize most of the hydrocarbons slipping from the LNT during rich regeneration from the LNT being saturated with NOx, but not enough oxygen to also oxidize most of the ammonia slipping from the LNT during the regeneration.

7. The system of claim 4, wherein the oxidation catalyst is close coupled with the LNT.

8. The system of claim 7, wherein the oxidation catalyst has a limited oxygen storage capacity, whereby there is sufficient stored oxygen to reduce most of the hydrocarbons slipping from the LNT when it is regenerated after being saturated with NOx, but not enough oxygen to reduce most of the ammonia slipping from the LNT during the regeneration.

9. A vehicle comprising the exhaust aftertreatment system of claim 1.

* * * * *